United States Patent
Hong

(10) Patent No.: US 11,574,785 B2
(45) Date of Patent: Feb. 7, 2023

(54) THERMAL CUTOFF

(71) Applicant: XIAMEN SET ELECTRONICS CO., LTD., Xiamen (CN)

(72) Inventor: Yaoxiang Hong, Xiamen (CN)

(73) Assignee: XIAMEN SET ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 17/293,827

(22) PCT Filed: Sep. 19, 2019

(86) PCT No.: PCT/CN2019/106809
§ 371 (c)(1),
(2) Date: May 13, 2021

(87) PCT Pub. No.: WO2020/186713
PCT Pub. Date: Sep. 24, 2020

(65) Prior Publication Data
US 2022/0013319 A1 Jan. 13, 2022

(30) Foreign Application Priority Data
Mar. 20, 2019 (CN) .......................... 201920354677.3

(51) Int. Cl.
*H01H 85/38* (2006.01)
*H01H 85/175* (2006.01)
(Continued)

(52) U.S. Cl.
CPC .......... *H01H 85/175* (2013.01); *H01H 85/12* (2013.01); *H01H 85/143* (2013.01); *H01H 85/38* (2013.01); *H01H 85/042* (2013.01)

(58) Field of Classification Search
CPC ...... H01H 85/042; H01H 85/06; H01H 85/08; H01H 85/12; H01H 85/143; H01H 85/1758; H01H 2085/048; H01H 2085/383
See application file for complete search history.

(56) References Cited

U.S. PATENT DOCUMENTS

| 5,373,278 | A | 12/1994 | Dav |
| 2001/0048579 | A1* | 12/2001 | Kanamaru ......... H01H 85/0411 361/103 |

(Continued)

FOREIGN PATENT DOCUMENTS

| CN | 101859665 A | 10/2010 |
| CN | 205900482 U * | 1/2017 |

(Continued)

OTHER PUBLICATIONS

CN-207097772-U Translation.*
CN-205900482-U Translation.*
WO-2011157230-A1 Translation.*

*Primary Examiner* — Jacob R Crum
(74) *Attorney, Agent, or Firm* — Bayramoglu Law Offices LLC

(57) ABSTRACT

A thermal cutoff includes a first fusible element, a second fusible element, and a closed cavity bounded by a housing having an open end, a cover plate, and a sealant. The two ends of the first fusible element and the two ends of the second fusible element are connected in parallel to a first electrode and a second electrode, respectively. The first fusible element and the second fusible element are provided in the closed cavity. A direction extending from a closed end to the open end of the housing is defined as a vertical direction. The first fusible element and the second fusible element are vertically arranged. The thermal cutoff has a (Continued)

vertical configuration and thus in its entirety has an elongated shape to meet corresponding application requirements.

10 Claims, 4 Drawing Sheets

(51) Int. Cl.
  *H01H 85/12* (2006.01)
  *H01H 85/143* (2006.01)
  *H01H 85/042* (2006.01)

(56) References Cited

U.S. PATENT DOCUMENTS

| | | | |
|---|---|---|---|
| 2003/0001716 A1 | 1/2003 | Kaltenborn et al. | |
| 2004/0085178 A1* | 5/2004 | Tanaka | C22C 12/00 337/159 |
| 2007/0025042 A1* | 2/2007 | Nishikawa | H01H 37/761 361/104 |
| 2015/0380196 A1* | 12/2015 | Darr | H01H 85/153 337/201 |
| 2017/0004947 A1* | 1/2017 | Hong | H01H 85/38 |

FOREIGN PATENT DOCUMENTS

| | | | | |
|---|---|---|---|---|
| CN | 207097772 U | * | 3/2018 | |
| WO | WO-2011157230 A1 | * | 12/2011 | H01H 37/761 |

* cited by examiner

THERMAL CUTOFF

CROSS REFERENCE TO THE RELATED APPLICATIONS

This application is the national phase entry of International Application No. PCT/CN2019/106809, filed on Sep. 19, 2019, which is based upon and claims priority to Chinese Patent Application No. 201920354677.3, filed on Mar. 20, 2019, the entire contents of which are incorporated herein by reference.

TECHNICAL FIELD

The present invention relates to a fusible thermal cutoff, and in particular, to a high-voltage thermal cutoff.

BACKGROUND

High-voltage thermal cutoffs have numerous applications. They are used, for example, as circuit protection devices in heating systems in electric vehicles. In a typical high-voltage thermal cutoff, two fuse links (where the two fuse links are both fusible alloys, or one of them is a fusible alloy and the other is an alloy wire) are arranged side by side horizontally. Applicant previously proposed thermal cutoffs, as disclosed in Chinese patent No. CN208093500U and No. CN206976273U, in which two fuse links are arranged side by side horizontally at the welding ends of two electrode plates.

Although the high-voltage thermal cutoff with such a configuration has advantages in manufacture, in its entirety, the high-voltage thermal cutoff is shaped like a large block or a flat sheet, and thus cannot be effectively used in many applications due to limitations caused by its shape. For example, in a heater of a liquid cooling system, due to the arrangement of the circuit board and other control parts, the space left for the thermal cutoff is relatively small. In this case, the prior parallel configuration is not suitable for positions with higher space requirements on compactness.

SUMMARY

To solve the foregoing problems, the present invention provides a thermal cutoff with an improved configuration.

A thermal cutoff is disclosed in the present invention, including a first fusible element, a second fusible element, and a closed cavity bounded by a housing having an open end, a cover plate and a sealant. The two ends of the first fusible element and the two ends of the second fusible element are connected in parallel to a first electrode and a second electrode. The first fusible element and the second fusible element are provided in the closed cavity. A direction extending from a closed end to the open end of the housing is defined as a vertical direction. The first fusible element and the second fusible element are vertically arranged.

By means of the foregoing technical solutions, the present invention implements a thermal cutoff with a vertical configuration, so that the thermal cutoff in its entirety has an elongated shape to meet corresponding application requirements.

The above description is merely a summary of the technical solutions of the present invention. In order to make the technical means of the present invention easily comprehensible and implemented in accordance with the content of the specification, and to make the above and other objectives, features and advantages of the present invention more obvious and easily comprehensible, the specific implementations of the present invention are described below.

BRIEF DESCRIPTION OF DRAWINGS

To describe the technical solutions in the embodiments of the present invention or in the prior art more clearly, the following briefly describes the drawings for describing the embodiments or the prior art. Apparently, the drawings in the following description show some embodiments of the present invention, and a person of ordinary skill in the art may still derive other drawings based on these drawings without creative efforts.

Figure 1:
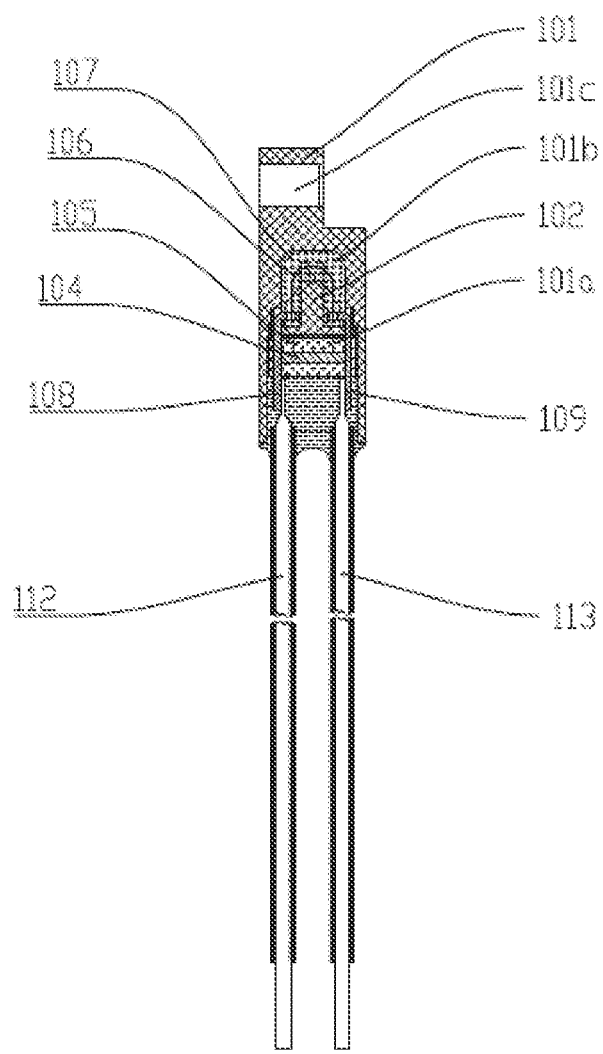
FIG. 1 is a cross-sectional view of a thermal cutoff according to Embodiment 1 of the present invention.

LIST OF REFERENCE NUMERALS housing: 101, 201, 301
first cavity: 101a, 201a, 301a
second cavity: 101b, 201b, 301b
mounting hole: 101c
cover plate: 102, 202, 302
bottom plate: 102e
first partition plate: 102c
second partition plate: 102d
third partition plate: 102f
undulating profiles: 102b, 102a
sealant: 103, 203, 303
current carrier: 104, 204, 304
fuse link: 106, 206, 306
fusing agent: 105, 205, 305
arc extinguishing medium: 107, 207, 307
first electrode plate: 108, 208, 308
second electrode plate: 109, 209, 309
one end of the first electrode plate: 108a
one end of the second electrode plate: 109a
first lead wire: 112, 212
second lead wire: 113, 213
clamping notch: 108b, 109b

DETAILED DESCRIPTION OF THE EMBODIMENTS

In order to make the objectives, technical solutions and advantages of the embodiments of the present invention clearer, the following embodiments of the present invention are described with reference to the drawings. The described embodiments are some rather than all of the embodiments of the present invention. Other embodiments obtained by those of ordinary skill in the art based on the embodiments presented without creative efforts shall fall within the protection scope of the present invention described.

The present invention provides the drawings to further illustrate the embodiments. The drawings, as a part of the disclosure of the present invention, are mainly used to illustrate the embodiments, and can explain the operating principles of the embodiments with reference to the related descriptions in this specification. With reference to such content, those of ordinary skill in the art can understand other possible implementations and the advantages of the present invention. Components in the drawings are not drawn to scale, and similar reference numerals generally represent similar components.

The present invention is further described below with reference to the drawings and specific embodiments.

To overcome the shortcomings of thermal cutoffs in the prior art, the present invention provides a thermal cutoff with an improved configuration as follows.

Embodiment 1

Figure 2:
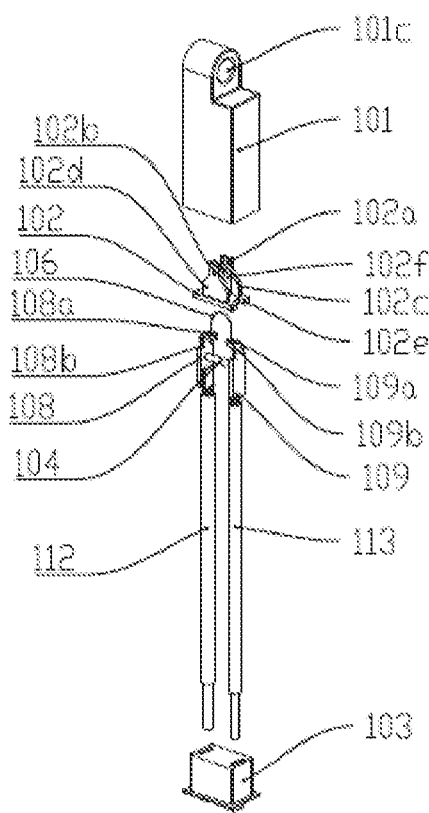
FIG. 2 is an exploded view of the thermal cutoff according to Embodiment 1 of the present invention.

As shown in FIG. 1 and FIG. 2, in the thermal cutoff of the present embodiment, a first fusible element and a second fusible element connected in parallel are provided as core functional devices in a closed cavity bounded by the housing 101, the cover plate 102, and the sealant 103. The housing 101 has the first cavity (current-carrying fusing cavity) 101a and the second cavity (high-voltage fusing cavity) 101b corresponding to a current-carrying fusible element and a high-voltage fusible element, respectively. The cover plate 102 is inserted into and fitted in an inner cavity of the housing 101 to divide the inner cavity into the first cavity 101a and the second cavity 101b. A direction extending from a closed end to an open end of the housing 101 is defined as a vertical direction. The second cavity 101b and the first cavity 101a in the present embodiment are vertically arranged (as shown in the figure). As it should be recognized, in the present embodiment, the housing 101 in a roughly rectangular shape connected to a semicircular piece is used as an example for description, while the cover plate 102 and the sealant 103 adapted to the housing 101 also have matching shapes, but the shapes of the housing 101, the cover plate 102 and the sealant 103 in the present embodiment should not be limited thereto. A person skilled in the art can adopt different shapes according to different applications and design requirements, but the housing 101 is preferably in an elongated shape, such as a cylinder or a hexagonal prism. The direction extending along the length of the housing 101 in an elongated shape is defined as the vertical direction. The cover plate 102 is inserted into and matches the inner cavity of the housing 101 (where a gap between the cover plate 102 and the housing 101 is also sealed by a small amount of sealant), and is located above the sealant 103 at the lower end, so that the inner cavity of the housing 101 is divided and partitioned into the second cavity 101b and the first cavity 101a arranged vertically. Preferably, in the present embodiment, the housing 101, the cover plate 102 and the sealant 103 are all made of materials with excellent insulation properties. For example, the housing 101 and the cover plate 102 are made of ceramic, and the sealant 103 is made of epoxy resin. In addition, in the present embodiment, the mounting hole 101c is provided on the semicircular piece of the housing 101, and the mounting hole 101c is configured for mounting and fixing to a protected device.

In the present embodiment, the first fusible element and the second fusible element serving as the core functional devices are described by taking a current-carrying fusible element and a high-voltage fusible element connected in parallel as an example. In the present embodiment, the current-carrying fusible element and the high-voltage fusible element are shown as the U-shaped fuse link 106 and the straight current carrier 104 arranged vertically. The melting point of the current carrier 104 is lower than the melting point of the fuse link 106, and the internal resistance value of the current carrier 104 is lower than the internal resistance value of the fuse link 106. Both ends of the U-shaped fuse link 106 have parallel segments. In this implementation, since the internal resistance value of the current carrier 104 is lower than the internal resistance value of the fuse link 106, when a normal operating current is conducting, the current-carrying capacity is mainly provided by the current carrier 104 serving as the current-carrying fusible element with a lower internal resistance value than the fuse link 106. The current carrier 104 is made of a fusible alloy. The fusible alloy generally refers to metal with a melting point of lower than 300° C. and alloys thereof. For example, the fusible alloy is made of Bi, Sn, Pb, In and other metal elements with low melting points. The fuse link 106 also adopts an electrothermal heating element with a higher fusing temperature serving as a fusible element, such as a silver-copper alloy, a fusible alloy, a constantan wire, a Fe—Cr—Al heating element, or a nickel-chromium wire.

In the present embodiment, in the closed cavity bounded by the housing 101, the cover plate 102, and the sealant 103, the first cavity 101a and the second cavity 101b are filled with the fusing agent 105 and the arc extinguishing medium 107, respectively. The fusing agent 105 contacts and wraps the current carrier 104 provided in the first cavity 101a, while the arc extinguishing medium 107 contacts and wraps the fuse link 106 provided in the second cavity 101b. The fusing agent 105 is selected from substances capable of reducing the surface tension of an alloy to be fused, for example, a solder paste made of rosin substances (natural rosin, synthetic rosin, and the like). The arc extinguishing medium 107 is selected from an arc extinguishing paste, quartz sand, sulfur hexafluoride, transformer oil, and the like. Under normal circumstances, the current mainly flows through the current carrier 104. When a protected device has an abnormal temperature rise, the temperature is transferred to the current carrier 104. When the temperature reaches the melting point of the current carrier 104, the current carrier 104 shrinks and breaks under the effect of the tension of the fusing agent 105, thereby breaking the parallel branch where the current carrier 104 is located. At the moment when the current carrier 104 fuses due to over-temperature, as the melting point of the fuse link 106 is higher than the melting point of the current carrier 104, the fuse link 106 still maintains a conducting state, and the current is all loaded on the fuse link 106, making the fuse link 106 generate heat. Under a combined action of the increasing heat and the rising temperature, the fuse link 106 reaches its melting point, and then the fuse link 106 shrinks rapidly and fuses itself. An arc is inevitably generated during the breaking process. Due to the parallel segments formed by the U-shaped structure, an electric field with high strength is generated therebetween, in which electrons repel each other to elongate the arc and accelerate the recombination and diffusion of free electrons and positive ions, thereby quickly cutting off the arc and implementing high-voltage breaking. In addition, the second cavity 101b is filled with the arc extinguishing medium 107 for extinguishing the arc, thereby protecting the safety of the circuit.

It should be noted that similar to the current carrier, the fuse link in the present embodiment in some application scenarios is also a fusible alloy made of Bi, Sn, Pb, In and other metal elements with low melting points, provided that the fuse link meets the following requirements by adjusting ratios of the elements: the melting point of the fuse link is higher than the melting point of the current carrier, and the internal resistance value of the fuse link is higher than the internal resistance value of the current carrier. In such an application scenario, the arc extinguishing medium filled in the second cavity of the present embodiment is replaced with a fusing agent.

In the present embodiment, the electrode for connecting the current carrier 104 to the fuse link 106 includes the first electrode plate 108 and the second electrode plate 109. The first electrode plate 108 and the second electrode plate 109 are of the same shape and are mirror-symmetric to facilitate mass production. Each of the first electrode plate 108 and the second electrode plate 109 is a roughly straight structure formed by stamping a conductive metal sheet. One end 108a (the upper end in the figure) of the straight first electrode plate 108 and one end 109a (the upper end in the figure) of the second electrode plate 109 are bent to form small L-shaped segments, which form a welding table to be connected to the two ends of the U-shaped fuse link 106, respectively. Opposite sides (inner sides) at the middle positions of the first electrode plate 108 and the second electrode plate 109 are connected to the two ends of the straight current carrier 104, respectively, to form an electrical parallel structure of the fuse link 106 and the current carrier 104 arranged vertically, corresponding to the second cavity 101b and the first cavity 101a arranged vertically, respectively.

In the present embodiment, the cover plate 102 includes the bottom plate 102e located at its lower end as well as the first partition plate 102c, the second partition plate 102d and the third partition plate 102f that are perpendicular to the bottom plate 102e. The first partition plate 102c and the second partition plate 102d are arranged in parallel at intervals, and the third partition plate 102f is perpendicular to both the first partition plate 102c and the second partition plate 102d. The third partition plate 102f separates the parallel segments of the U-shaped fuse link 106, while the first partition plate 102c and the second partition plate 102d are configured to separate the two outer sides of the fuse link 106, respectively. The first electrode plate 108 and the second electrode plate 109 are provided with the clamping notches 108b, 109b between the current carrier 104 and the fuse link 106 arranged vertically. Both sides of the bottom plate 102e of the cover plate 102 are provided with clamping grooves corresponding to the clamping notches 108b, 109b of the first electrode plate 108 and the second electrode plate 109, so that the cover plate 102 vertically separates the current carrier 104 and the fuse link 106. In addition, in order to increase the creepage distance to improve safety, the contours of each of the first partition plate 102c, the second partition plate 102d, and the third partition plate 102f have the undulating profiles 102b, 102a, which, for example, are concave-shaped undulating profiles as shown in the figure of the present embodiment. In addition, in order to increase the creepage distance to improve safety, a top inner wall of the housing in the present embodiment is further provided with ridges or protrusions (not shown in the figure) to increase the creepage distance.

To achieve better sealing protection performance to meet the requirements for use in the field of waterproofing, in the present embodiment, the other end (the lower end in the figure) of the first electrode plate 108 is welded to the first lead wire 112, and the other end (the lower end in the figure) of the second electrode plate 109 is welded to the second lead wire 113, so as to form an electrical connection between the first lead wire 112, the first electrode plate 108, the current carrier 104, the fuse link 106, the second electrode plate 109, and the second lead wire 113. In the present embodiment, the first lead wire 112 and the second lead wire 113 are welded to the inner sides of the first electrode plate 108 and the second electrode plate 109, respectively, and extend vertically downward. The welding between the first lead wire 112 and the first electrode plate 108 as well as the welding between the second electrode plate 109 and the second lead wire 113 are implemented by spot welding using tin solder, ultrasonic metal welding, or the like. The first lead wire 112 and the second lead wire 113 are both multi-stranded wires, such as copper stranded wires, and thus can be bent more flexibly. Each of the first lead wire 112 and the second lead wire 113 is wrapped by an insulating sheath. The material of the insulating sheath is selected from Teflon, silicone rubber, a polyester material and other insulators with excellent insulation properties. In the present embodiment, the sealant 103 needs to meet filling requirements as follows: the sealant 103 at least covers the weld between the first lead wire 112 and the first electrode plate 108 and an end of the first lead wire 112, and also covers the weld between the second electrode plate 109 and the second lead wire 113 and an end of the second lead wire 113.

In addition, in the present embodiment, the first lead wire 112 and the second lead wire 113 are led out from the same end and extend downward to form a package structure with a radial configuration. The package structure with the radial configuration is more suitable for the main circuit of the PTC heater than a package structure with axial configuration in the prior art, and does not need to fold back the wire harness at one end, which facilitates the mounting operation. In addition, the electrode plates are welded to the lead wires before being led out, and the welds and the ends of the lead wires are sealed with a sealant, so as to achieve an excellent sealing protection effect, which is in line with the requirements for use in the field of waterproofing. It should be noted that in other application scenarios, it is also feasible to replace the package structure with the radial configuration in Embodiment 1 by a package structure with an axial configuration similar to that in Chinese patent Nos. CN208093500U and CN206976273U in the prior art.

In addition, in Embodiment 1, since the first fusible element and the second fusible element (the current-carrying fusible element and the high-voltage fusible element) are arranged vertically, in such a structural configuration, the thermal cutoff in the present embodiment is longer and slimmer than the existing thermal cutoff with a parallel horizontal configuration, and is thus applicable to some occasions with specific needs. For example, in a heater of a liquid cooling system, due to the arrangement of the circuit board and other control parts, the space left for the thermal cutoff is relatively small. In this case, the prior parallel configuration is not suitable for positions with higher space requirements on compactness, and the thermal cutoff of the present embodiment can be used instead to meet such application requirements. In addition, Embodiment 1 adopts a sealed structural design to achieve an excellent sealing protection effect, which is in line with the requirements for use in the field of waterproofing. In addition, in the present embodiment, the current-carrying fusible element and the high-voltage fusible element are spaced apart, and the fuse link serving as the high-voltage fusible element is made of a material with higher voltage withstand capability and is filled with the arc extinguishing medium, so as to withstand a higher voltage level. The present embodiment adopts an elongated shape design while having a range of high-voltage applications, and is applicable to scenarios where the operating voltage is lower than 850-1000 VDC.

Embodiment 2

Figure 3:
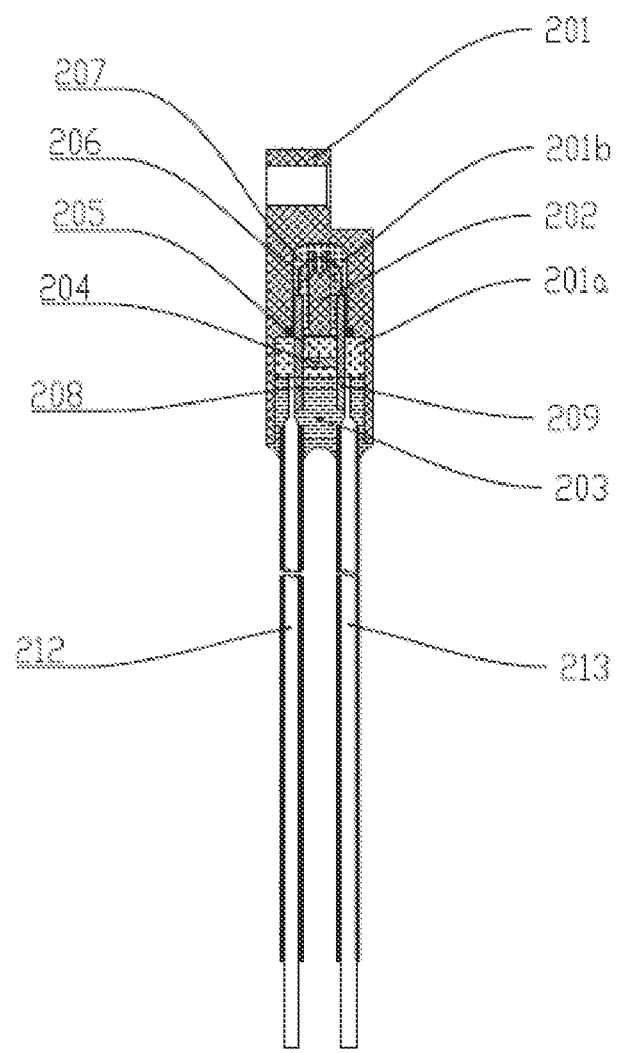
FIG. 3 is a cross-sectional view of a thermal cutoff according to Embodiment 2 of the present invention.
Figure 4:
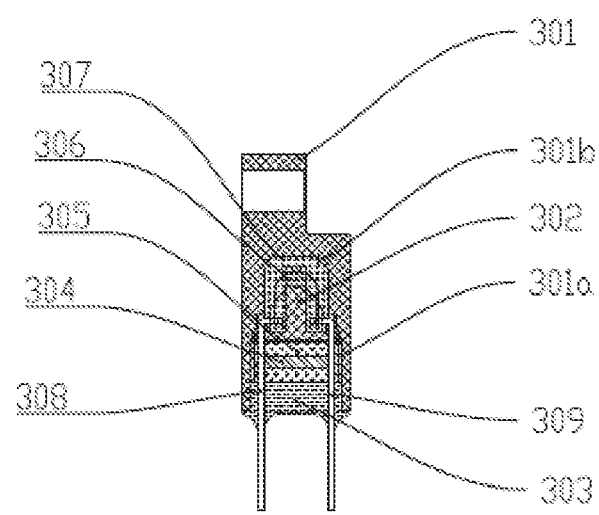
FIG. 4 is a cross-sectional view of a thermal cutoff according to Embodiment 3 of the present invention.

As shown in FIG. 3, the thermal cutoff of Embodiment 2 is similar to that of Embodiment 1. In the thermal cutoff of the present embodiment, a current-carrying fusible element and a high-voltage fusible element connected in parallel are provided as core functional devices in a closed cavity bounded by the housing 201, the cover plate 202, and the sealant 203. The housing 201 has the first cavity (current-carrying fusing cavity) 201a and the second cavity (high-voltage fusing cavity) 201b corresponding to the current-carrying fusible element and the high-voltage fusible element, respectively. The cover plate 202 is inserted into and fitted in an inner cavity of the housing 201 to divide the inner cavity into the first cavity 201a and the second cavity 201b arranged vertically. In the present embodiment, the current-carrying fusible element and the high-voltage fusible element connected in parallel are shown as the U-shaped fuse link 206 and the straight current carrier 204 arranged vertically. The melting point of the current carrier 204 is lower than the melting point of the fuse link 206, and the internal resistance value of the current carrier 204 is lower than the internal resistance value of the fuse link 206. In the present embodiment, the first cavity 201a and the second cavity 201b are filled with the fusing agent 205 and the arc extinguishing medium 207 (which is alternatively a fusing agent depending on the material of the fuse link), respectively. The fusing agent 205 contacts and wraps the current carrier 204 provided in the first cavity 201a, while the arc extinguishing medium 207 contacts and wraps the fuse link 206 provided in the second cavity 201b.

The difference between Embodiment 2 and Embodiment 1 is as follows. In the present embodiment, the first electrode plate 208 and the second electrode plate 209 for connecting the current carrier 204 to the fuse link 206 are roughly straight identical sheet structures that are mirror-symmetric and formed by stamping conductive metal sheets. The upper ends of the first electrode plate 208 and the second electrode plate 209 are not bent into a welding table similar to that in Embodiment 1, and the U-shaped fuse link 206 is directly welded to the upper ends thereof. In the present embodiment, the first electrode plate 208 and the second electrode plate 209 are less convenient to weld compared with Embodiment 1, but the stamping process of the electrode plate is simpler in manufacture and thus has certain cost advantages. In addition, another difference of the present embodiment is that the other end (the lower end in the figure) of the first electrode plate 208 is welded to the first lead wire 212 on the outer side, and the other end (the lower end in the figure) of the second electrode plate 209 is welded to the second lead wire 213 on the outer side. Compared with the welding operation at the inner sides in Embodiment 1, the welding operation in the present embodiment is simpler and more convenient while achieving the same sealing protection effect.

Embodiment 3

The thermal cutoff of Embodiment 3 is similar to that of Embodiment 1. In the thermal cutoff of the present embodiment, a current-carrying fusible element and a high-voltage fusible element connected in parallel are provided as core functional devices in a closed cavity bounded by the housing 301, the cover plate 302, and the sealant 303. The housing 301 has the first cavity (current-carrying fusing cavity) 301a and the second cavity (high-voltage fusing cavity) 301b corresponding to the current-carrying fusible element and the high-voltage fusible element, respectively. The cover plate 302 is inserted into and fitted in an inner cavity of the housing 301 to divide the inner cavity into the first cavity 301a and the second cavity 301b arranged vertically. In the present embodiment, the current-carrying fusible element and the high-voltage fusible element connected in parallel are shown as the U-shaped fuse link 306 and the straight current carrier 304 arranged vertically. The melting point of the current carrier 304 is lower than the melting point of the fuse link 306, and the internal resistance value of the current carrier 304 is lower than the internal resistance value of the fuse link 306. In the present embodiment, the first cavity 301a and the second cavity 301b are filled with the fusing agent 305 and the arc extinguishing medium 307 (which is alternatively a fusing agent depending on the material of the fuse link), respectively. The fusing agent 305 contacts and wraps the current carrier 304 provided in the first cavity 301a, while the arc extinguishing medium 307 contacts and wraps the fuse link 306 provided in the second cavity 301b.

In the present embodiment, the electrode for connecting the current carrier 304 to the fuse link 306 includes the first electrode plate 308 and the second electrode plate 309. The first electrode plate 308 and the second electrode plate 309 are roughly straight structures formed by stamping conductive metal sheets, and are mirror-symmetric. One end (the upper end in the figure) of the straight first electrode plate 308 and one end (the upper end in the figure) of the second electrode plate 309 are bent to form small L-shaped segments, which form a welding table to be connected to the two ends of the U-shaped fuse link 306, respectively. Opposite sides (inner sides) at the middle positions of the first electrode plate 308 and the second electrode plate 309 are connected to the two ends of the straight current carrier 304, respectively, to form an electrical parallel structure of the fuse link 306 and the current carrier 304 arranged vertically, corresponding to the second cavity 301b and the first cavity 301a arranged vertically, respectively. The other ends (the lower ends in the figure) of the first electrode plate 308 and the second electrode plate 309 extend outside the opening of the housing 301, such that the first electrode plate 308 and the second electrode plate 309 serve as electrode pins of the thermal cutoff and may be used as plug-in pins.

The difference between Embodiment 3 and Embodiment 1 is that in the present embodiment, the first electrode plate 308 and the second electrode plate 309 for connecting the current carrier 304 to the fuse link 306 extend outside the opening of the housing 301 as electrode pins, while removing the two lead wires each wrapped by an insulating sheath as in Embodiment 1. Compared with Embodiment 1, the present embodiment has a lower protection rating, but is simpler in manufacture and economizes on materials, and thus has a certain cost advantage while meeting general protection requirements.

Additionally, it should be noted that in Embodiment 1 to Embodiment 3 above, the current-carrying fusible element and the high-voltage fusible element connected in parallel are as shown as examples of the fusible elements, and can be applied in high-voltage occasions. However, in other lower-voltage occasions, it is also feasible to implement the first fusible element and the second fusible element by adopting two parallel, vertically arranged fusible alloys made of metal elements with low melting points, such as Bi, Sn, Pb, and In (similar to CN206976273U) to form a thermal cutoff that has a more elongated shape (compared with CN206976273U).

Although the present invention is specifically illustrated and introduced in combination with the preferred embodiments, those skilled in the art should understand that various changes may be made to the present invention in terms of forms and details without departing from the spirit and scope of the present invention defined in the appended claims, and these changes shall fall within the scope of protection of the present invention.

The embodiments of the device described above are merely illustrative, where units described as separate components may or may not be physically separated. Components displayed as units may or may not be physical units, that is, the components may be located in one place, or may be distributed to multiple network units. Some or all of the modules may be selected according to actual needs to achieve the objective of the solution of the embodiment. Those of ordinary skill in the art can understand and implement the present invention without creative efforts.

The phrase "an/one embodiment", "embodiment" or "one or more embodiments" mentioned herein means that a specific feature, structure, or characteristic described in combination with the embodiment is included in at least one embodiment of the present invention. In addition, it should be noted that the phrase example "in an/one embodiment" herein does not necessarily refer to the same embodiment.

In the specification provided herein, a large number of specific details are described. However, it can be understood that the embodiments of the present invention can be practiced without the specific details. In some embodiments, well-known methods, structures and techniques are not shown in detail to avoid obscuring the understanding of this specification.

In the claims, any reference sign between brackets should not be constructed as a limitation to the claims. The word "include/comprise" does not exclude the presence of elements or steps not listed in the claims. The word "one" or "a/an" preceding an element does not exclude the existence of multiple such elements. The present invention can be implemented with the assistance of hardware including several different components and the assistance of a properly programmed computer. In the claims of a unit where several devices are listed, several of the devices may be embodied by the same hardware item. The words such as first, second, and third are not used to indicate any order or sequence and may be interpreted as names.

Finally, it should be noted that the foregoing embodiments are merely used to explain the technical solutions of the present invention, but are not intended to limit the same. Although the present invention is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present invention.

What is claimed is:

1. A thermal cutoff, comprising:
a first fusible element;
a second fusible element; and
a closed cavity;
wherein,
the closed cavity is bounded by a housing, a cover plate, and a sealant;
the housing has an open end;
two ends of the first fusible element and two ends of the second fusible element are connected in parallel to a first electrode plate and a second electrode plate, respectively;
the first fusible element and the second fusible element are provided in the closed cavity;
a direction extending from a closed end of the housing to the open end of the housing is defined as a vertical direction;
the first fusible element and the second fusible element are vertically arranged;
the housing has a cavity;
the cover plate is inserted and fitted in the cavity of the housing to divide the cavity into a first cavity and a second cavity arranged vertically;
the first fusible element and second fusible element are vertically arranged in the first cavity and the second cavity, respectively;
the first fusible element is a current-carrying fusible element, and the second fusible element is a high-voltage fusible element;
the current-carrying fusible element comprises a current carrier, and the high-voltage fusible element comprises a fuse link;
a melting point of the current carrier is lower than a melting point of the fuse link;
an internal resistance value of the current carrier is lower than an internal resistance value of the fuse link;
each of the first electrode plate and the second electrode plate is a substantially straight structure;
two ends of the fuse link are connected to upper ends of the first electrode plate and the second electrode plate, respectively; and
two ends of the current carrier are connected to opposite sides at middle positions of the first electrode plate and the second electrode plate, respectively.

2. The thermal cutoff according to claim 1, wherein the first cavity is filled with a first fusing agent contacting and wrapping the current carrier, and
the second cavity is filled with an arc extinguishing medium or a second fusing agent contacting and wrapping the fuse link.

3. The thermal cutoff according to claim 1, wherein the current carrier is straight,
the fuse link is U-shaped, and
the two ends of the fuse link have parallel segments.

4. A thermal cutoff, comprising:
a first fusible element;
a second fusible element; and
a closed cavity;
wherein,
the closed cavity is bounded by a housing, a cover plate, and a sealant;
the housing has an open end;
two ends of the first fusible element and two ends of the second fusible element are connected in parallel to a first electrode plate and a second electrode plate, respectively;
the first fusible element and the second fusible element are provided in the closed cavity;
a direction extending from a closed end of the housing to the open end of the housing is defined as a vertical direction;
the first fusible element and the second fusible element are vertically arranged;
the housing has a cavity;
the cover plate is inserted and fitted in the cavity of the housing to divide the cavity into a first cavity and a second cavity arranged vertically;
the first fusible element and second fusible element are vertically arranged in the first cavity and the second cavity, respectively;

the first fusible element is a current-carrying fusible element, and the second fusible element is a high-voltage fusible element;

the current-carrying fusible element comprises a current carrier, and the high-voltage fusible element comprises a fuse link;

a melting point of the current carrier is lower than a melting point of the fuse link;

an internal resistance value of the current carrier is lower than an internal resistance value of the fuse link;

the cover plate comprises a bottom plate, a first partition plate, a second partition plate, and a third partition plate;

the bottom plate is located at a lower end of the cover plate;

the first partition plate, the second partition plate, and the third partition plate are perpendicular to the bottom plate;

the first partition plate and the second partition plate are arranged in parallel at intervals;

the third partition plate is perpendicular to both the first partition plate and the second partition plate;

the third partition plate separates parallel segments of the fuse link from each other; and the first partition plate and the second partition plate are configured for separating two outer sides of the fuse link, respectively.

5. The thermal cutoff according to claim 4, wherein the first electrode plate and the second electrode plate are provided with clamping notches between the current carrier and the fuse link arranged vertically;

both sides of the bottom plate of the cover plate are provided with clamping grooves corresponding to the clamping notches of the first electrode plate and the second electrode plate, and the cover plate vertically separates the current carrier and the fuse link.

6. The thermal cutoff according to claim 5, wherein the first partition plate, the second partition plate and the third partition plate each have undulating profiles to increase a creepage distance.

7. The thermal cutoff according to claim 1, wherein the housing is in an elongated shape.

8. The thermal cutoff according to claim 1, further comprising a first lead wire and a second lead wire;

wherein the first lead wire and the second lead wire are welded to inner sides of the first electrode plate and the second electrode plate, respectively; and the first lead wire and the second lead wire extend vertically downward.

9. The thermal cutoff according to claim 8, wherein each of the first lead wire and the second lead wire is wrapped by an insulating sheath;

the sealant at least covers a weld between the first lead wire and the first electrode plate and an end of the first lead wire, and the sealant further covers a weld between the second electrode plate and the second lead wire and an end of the second lead wire.

10. The thermal cutoff according to claim 3, wherein one end of the first electrode plate and one end of the second electrode plate are bent to form L-shaped segments to form a welding table to be connected to the two ends of the fuse link, respectively.

\* \* \* \* \*